US006669589B2

United States Patent
Onogi

(10) Patent No.: US 6,669,589 B2
(45) Date of Patent: Dec. 30, 2003

(54) CONTINUOUSLY VARIABLE TRANSMISSION

(75) Inventor: Kenkichi Onogi, Tokyo (JP)

(73) Assignee: Tokyo Automatic Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/112,761

(22) Filed: Apr. 2, 2002

(65) Prior Publication Data

US 2002/0115510 A1 Aug. 22, 2002

Related U.S. Application Data

(62) Division of application No. 09/627,397, filed on Jul. 27, 2000, now Pat. No. 6,398,680.

(51) Int. Cl.[7] .................................................. F16H 9/18
(52) U.S. Cl. ............................ 474/69; 474/46; 474/30; 474/23
(58) Field of Search ............................. 474/46, 30, 18, 474/23, 70, 69, 28, 72, 39, 43, 37, 12, 13

(56) References Cited

U.S. PATENT DOCUMENTS

| | | | | |
|---|---|---|---|---|
| 2,170,212 A | * | 8/1939 | Pfleger .......................... | 474/23 |
| 3,949,621 A | | 4/1976 | Beusink et al. | |
| 4,493,681 A | | 1/1985 | Takano | |
| 4,515,575 A | * | 5/1985 | Kinbara et al. ................ | 474/13 |
| 4,735,598 A | * | 4/1988 | Moroto et al. ................. | 474/29 |
| 4,884,997 A | * | 12/1989 | Hattori ........................ | 474/28 |
| 4,904,229 A | * | 2/1990 | Hattori ........................ | 474/12 |
| 4,973,288 A | | 11/1990 | Sakakibara et al. | |
| 5,269,726 A | | 12/1993 | Swanson et al. | |
| 6,120,400 A | * | 9/2000 | Onogi .......................... | 474/46 |
| 6,383,102 B1 | * | 5/2002 | Onogi .......................... | 474/46 |

FOREIGN PATENT DOCUMENTS

| | | | |
|---|---|---|---|
| EP | 0 931 960 A | | 7/1999 |
| JP | 58-17248 A | * | 2/1983 |
| JP | 63-225753 A | * | 9/1988 |
| JP | 63-318355 A | | 12/1988 |

* cited by examiner

*Primary Examiner*—Marcus Charles
(74) *Attorney, Agent, or Firm*—Rothwell, Figg, Ernst & Manbeck

(57) ABSTRACT

Disclosed is a continuously variable transmission in which when a shaft torque is secured by a belt friction force generated by externally pressing a pulley, difficulties of transmission and deteriorations of efficiency caused by short or surplus of the friction force of input and output pulleys are overcome, as a consequence of which the stable friction transmission with high efficiency and widened ratio range can be achieved. The continuously variable transmission includes a first transmission device performing higher efficiency in a big ratio range of the transmittable range than a second transmission device, the second transmission device performing higher efficiency in a small ratio range of the transmittable range than the first transmission device, and a switching device changeably selecting in the alternative the first and the second transmission devices, to combine with the big and small ratio ranges to enlarge an entire transmittable range while keeping high efficiency.

38 Claims, 11 Drawing Sheets

CONTINUOUSLY VARIABLE TRANSMISSION

CROSS-REFERENCE TO RELATED APPLICATIONS

This application is a divisional of U.S. patent application Ser. No. 09/627,397 filed Jul. 27, 2000, now U.S. Pat. No. 6,398,680 B1, from which the present application claims priority based on Japanese patent application Ser. No. 2000-213513 filed on Jun. 9, 2000.

BACKGROUND OF THE INVENTION

1. Field of the Invention

The present invention relates to a continuously variable transmission used for general industrial machineries, vehicles, electric motors and so on, and particularly to a variable transmission for controlling a variable torque while distinguishing and supplying the elastic force and the pressing force to a pulley and performing the friction force stabilization and the high efficient transmission.

2. Related Art

The motion of a fixed horse power type belt continuously variable transmission has been developed in U.S. Pat. Nos. 4,973,288, 5,269,726 and the like, but satisfactory products have not been realized. Both the patents have an idea that in the former, input and output pulleys are simultaneously pressed by oil pressure and in the latter, by screw winding up. However, these ideas have decisive and important or principle defects. Normally, the output horse power P [W] which is transmitted by an output pulley to a load is determined by a relation formula $P=1.027 \times N \times T$ between the rotating speed N [rpm] and the torque T [Kgm]. The rotating speed is decided by a contact position between a belt and a pulley, that is, a radius ratio, while the torque is decided by a contact friction pressure therebetween. This means that the rotating speed is determined merely by the positioning control of the belt in the pulley, while the shaft torque is always determined merely by the friction pressure control of the pulley. Accordingly, with respect to the securing measures for the desired rotating speed and torque in the continuously variable transmission, the aforementioned relation equation itself shows that the variable pitch positioning control and the friction pressure control are distinguished and applied to the pulleys and synchronously operated mutually. However, in the ideas of the above-described U.P. patents, even if the positioning function by a supply of pressing force should be applied synchronously to the input and output pulleys, there is no assurance of always maintaining a proper belt position, and not to mention, the torque assurance function for always applying the desired friction force to both the pulleys is not present at all in the transmitting system. This indicates that in the ideas of the aforesaid patents, secureness and maintenance of proper rotating speed and torque can not be accomplished, and the desired horse power transmission is impossible in terms of principle.

On the other hand, the present applicant has proposed, in EP Application publication No. EP 0931960A2, separation of roles for functions of the pressing control and the positioning control to two input and output pulleys. However, some unsolved problems still remain. The first problem is that the friction force between the belt and the pulley is instable, and the second problem is that the transmission efficiency is deteriorated. The former disables the transmission in the low speed area of a tension type belt. The cause is that in the friction force securing measures by the external pressing to the pulley directly, when the contact radius or area increases, the friction coefficient of the transmission surface becomes instable to bring forth the surplus friction force. In the latter, even a compression type belt, the transmission efficiency is maximum at and in the vicinity of the speed ratio $\epsilon=1$ but in the other speed ratio areas, the contact area of both the pulleys is unbalanced and the efficiency is worsened therein. That is, the cause is supposed to result from the simultaneous generation of heat generation caused by the moving-in or rolling-in of the belt due to the surplus friction force on the side where the contact area in both the pulleys increases, and heat generation of a slip due to the short of friction force on the side where the contact area reduces.

SUMMARY OF THE INVENTION

It is a common object of the present invention to provide a continuously variable transmission particularly suitable for a constant horse power type in which when the friction force between a variable pitch pulley V-groove and a V-belt is controlled by a supply of external pressing force of an operating unit, the friction force of the other pulley is controlled by a supply of external elastic force in order to secure a shaft torque of one pulley out of input and output pulleys, the shaft torque of said one pulley is indirectly adjusted via a belt tension, not being restricted by the kind of belts.

It is a first object of the present invention to provide an arrangement wherein particularly in order to secure a torque of an output pulley, a controlling device compensates for a short of the friction force of an input pulley, always supplies the elastic force to the input pulleys to variably control the friction force of the input pulley, and to indirectly perform variable torque control the output pulley via a belt tension.

It is a second object of the present invention to provide an arrangement wherein in order to avoid rolling-in of a belt caused by direct pressing to an output pulley to stably secure the output friction force, a controlling device variably press-controls a pressing value for always supplying the elastic force to an input pulley, indirectly makes use of a wedge effect of an output pulley V-groove to control the output friction force and variably controls torque, whereby a constant horse power transmission is achieved with high efficiency and stableness in particularly a large ratio area without being restricted by the kinds of belts such as a tension type or a compression type.

It is a third object of the present invention to provide a continuously variable transmission which enlarges the whole variable speed area and has the optimum transmitting efficiency, wherein a short of the friction force of an input pulley and a surplus of the friction force of an output pulley in a large ratio area are suppressed, and also a surplus of the friction force of an input pulley and/or a short of the friction force of an output pulley in a small ratio area are suppressed.

It is a fourth object of the present invention to provide a continuously variable transmission performing the high efficient and stable transmission, wherein when said third object is embodied, an operating mechanism capable of distinguishing the pressing force and the elastic force and/or a simple pressing mechanism capable of distinguishing and supplying the pressing force and the elastic force are disposed on one of input and output pulleys and on the other, respectively.

It is a fifth object of the present invention to provide an operating mechanism capable of distinguishing and supplying, in response to respective instructions, the non-elastic pressing force for accurately positioning a pulley V-groove to a variable disk of one or both of an input pulley and an output pulley of a continuously variable transmission, and the elastic fore for settling the absorption of errors, impact vibrations or the like caused in the transmitting operation.

It is a sixth object of the present invention to provide a pressing mechanism, which is further simplified in said fifth object, capable of distinguishing and supplying, in response to a single control instruction, the non-elastic pressing force to a variable disk of one or both input and output pulleys simply and with light weight, and the elastic force of an elastic member.

The common object of the present invention is achieved by a continuously variable transmission, wherein in order to secure a torque of one pulley out of input and output pulleys for effecting the constant horse power transmission, an operating unit always supplies and controls the elastic force generated by compressing in series an elastic device by a compressing device to the other pulley and variably presses and controls said other pulley in response to an instruction of output rotating speed or speed ratio, and a controlling device controls the shaft torque of said one pulley indirectly via a belt by operation of the friction force of said other pulley to perform the variable torque control.

The first object of the present invention is achieved by an arrangement wherein an input operating unit, which comprises a pressing device for always supplying the elastic force generated by series-compressing an elastic device by a compressing device to an input pulley, and a driving source for effecting the variable pressing control via said pressing device according to an instruction of a controlling device, variably presses and controls the friction force of an input pulley to thereby indirectly variably torque-control the shaft torque of said output pulley via a belt.

The second object of the present invention is achieved by an arrangement wherein the follower function for always effecting variable press-control by a supply of the elastic force and the reference function for effecting variable positioning control substantially under non-pressure at the time of non-speed change motion and under pressure at the time of speed change motion are applied to an input pulley and an output pulley, respectively, and a controlling device indirectly variably torque-controls an output shaft by the wedge friction force formed from a V-belt and a V-groove of the output pulley from the friction force of the input pulley by an input operating unit via said V-belt.

The third object of the present invention is achieved by an arrangement wherein in a large ratio area of a continuously variable transmission, the follower function and the reference function are given to an input pulley and an output pulley, respectively, while in a small ratio area, the reference function and the follower function are given to the input pulley and the output pulley, respectively, and each operating unit or controlling device switches the operating functions of the respective pulleys halfway of the speed change area.

The fourth object of the present invention is achieved by an arrangement wherein one and the other of movable disks of input and output pulleys are pressed and switched by an individual operating unit in which two compressing devices individually series-connect an elastic device and a contact device, and by a distinguishing operating unit in which a single compressing device series-connects a parallel body comprising an elastic device and a contact device, respectively.

The fifth object of the present invention is achieved by an operating unit in which a first pressing device having an elastic device and a first compressing device superposed in series to one or both of movable disks of input and output pulleys and a second pressing device having a contact device and a second compressing device connected in series individually supply the elastic force and the pressing force, respectively.

The sixth object of the present invention is achieved by an operating unit in which a pressing device having an elastic device and a compressing device superposed in series and having a contact device and said elastic device connected in parallel, to one or both of movable disks of input and output pulleys, distinguishes and supplies a speed change area to an elastic force area and a pressing force area in response to a control instruction.

Forms for Carrying Out the Invention

The idea of the present invention is not limited to a wet type in which both a variable speed transmission device and a variable speed control device are received in an oil pan, but a dry type in which both the devices are received in air or a dry type in which they are individually received may be applied. Further, the present invention may be applied particularly to a constant horse power transmission type transmission or a constant torque type transmission which exhibits a great effect. While for an operating unit of a variable speed control device, an individual pressing system comprising a first and a second pressing device in distinguishing the pressing force and the elastic force, and a composite pressing system using a composite device have been disclosed, it is to be noted that both input and output operating units may be of an individual pressing system, or an arrangement, in which an input side is of a composite pressing system and an output side is of an individual pressing system, may be employed. In this case, pre-pressure Pso shown in FIG. 6B need not always be applied to the output pulley. All of the pressing device for pressing a pulley, the composite device, the compressing device, the elastic device or the contact device are illustrated in the non-rotational arrangement, but they can be used in the rotational state, and the mounting position thereof is not restricted to the periphery of the pulley but they can be disposed in a suitable position by a pressure transmitting device of oil pressure or a lever.

While in switching the pressing force of an operating unit into the elastic force, an example of switching at the speed ratio speed $\epsilon=1$ has been shown, it is to be noted that the switching can be done at a suitable speed ratio, and as the reference of the switching operation, the output rotating speed or the output torque may be employed instead of the speed ratio. In this case, preferably, both the output rotating speed and the torque are subjected to the momentary bumpless transfer. When the input power is changed in speed as in the internal combustion engine, the DC motor or the like, the continuously variable transmission remains at a certain constant speed ratio, and only the output torque may be applied with the variable pressing control by an input or output operating unit corresponding to the number of an input or output rotation. Since the pulley of the reference function performs the rotating speed control and that of the follower function performs the torque control, it is obvious that when the operating unit is switched in function, naturally, a control instruction supplied from the controlling device should be simultaneously switched, and said instruction should naturally be distinguished from a rotating speed instruction of a speed increase and a speed decrease, and a torque instruction of a pressure increase and a pressure decrease for the supply control. Accordingly, at the time of deterioration of a belt, the compensated rotating speed instruction and at the time of deterioration of an elastic member, the compensated torque instruction should be switched and supplied, respectively. It should be noticed that synchronous operation is a motion in which the number of rotation No is inversely proportional to or proportional to the output torque To and a constant-horsepower transmission and a constant torque transmission are synchronously associated with each other, while the asynchronous operation is a motion in which the number of rotation No and the torque To are not synchronously associated with each other. Therefore, the single variable control for only the follower pulley allows The control of the output shaft torque according to a variable speed input power. If the No and To are simultaneously decreased and then are stopped when the transmission stop instruction is supplied, the elastic member is free from deterioration caused by a high pressure during the stoppage and a low speed start-up is achieved at the time of next start for transmission.

Further, the substitution and common use of various devices, parts or the like can be variously changed. The pressing device is arbitrary in arrangement and order if the compressing device is connected in series with the elastic device and/or the contact device. The compressing device may be other winches, hydraulic jacks or the like if it can hold stably the pressing position after the stoppage of supplying a instruction signal. The elastic device may be any type without limited to the dish spring. The contact device may be also of other forms, for example, the elastic members themselves cause to have contact elements and are arranged in series. The pressing means such as slider elements, sliders, sliding materials or the like may be jointly used one another, or substituted for other members such as bodies, pulley disks, pressure transmitting devices or the like. The pressure transmitting device and the detector may be of any other types, and for example, the pressure transmitting device may transmit pressure within a hollow shaft of a pulley. While an example has been shown in which the control motors as a driving source are individually disposed every pressing device, it is noted that they can be used in common or simplified using a switching unit such as the well-known transmission or gear synchronous fitting device, and the motors may be of AC or a step motor. In the simultaneous pressing device of the movable disk and the elastic member, the operating amount of the compressing device may be constituted to be proportional or inversely proportional between relative distances of both disks and to be inversely proportional or proportional between the elastic forces of the elastic members, respectively.

The pressing device having the motor and the compressing device requires to withstand high pressure of pulleys, positioning with high accuracy for a long period, and supplying and controlling of pressure vales. Therefore, it is necessary in a pressurizing system to eliminate positively error signal factors to control instructions such as a self-locking function, that is, a reversing-impeding function and a motor overrun-impeding function. Accordingly, one direction transmission such as a metal surface contact friction means such as a trapezoidal screw or a worm transmission should be used, and a motor with a clutch, brake function or a reversing-impeding step motor should be applied. The sliding amount of the compressing device merely comprises the pulley moving portion lp in the reference function, but in the follower function, the elastic member compressing amount ls is added, totaling to lp+ls in the moving amount. Accordingly, the rotating speed instruction and the torque instruction are different from each other in the operating amount as well as the operating direction, and in case of the winding-up sliding device, the known elements such as the winding-up pitch, rotational direction, thread-groove machined direction such as right thread and left thread, and ratio of the gear transmitter may be selected according to the design.

Various control forms of the controlling device 90 are considered. When the accuracy is not required in the output rotating speed N0 or the output torque T0, the operating amount initially set in advance may be supplied. When the high accuracy is maintained and the high speed response of the speed change motion is preferential, the circumferential length of a belt or the deteriorated error of the settling of an elastic member are periodically detected, the compensating amount is calculated and added so as to have a value determined in advance in a memory by cpu to instructions of the rotating speed or torque according to the deteriorated amount to impart them to operating units and servo control the detected value in an open loop without feeding it back. Further, where the high accurate control is required, the detected values are compared with a reference value determined in advance in a memory to supply a negative feedback control to input or output operating unit, thereby performing a long-term operation with extremely high efficiency.

DESCRIPTION OF THE PREFERRED EMBODIMENTS

First Embodiment

Figure 2:
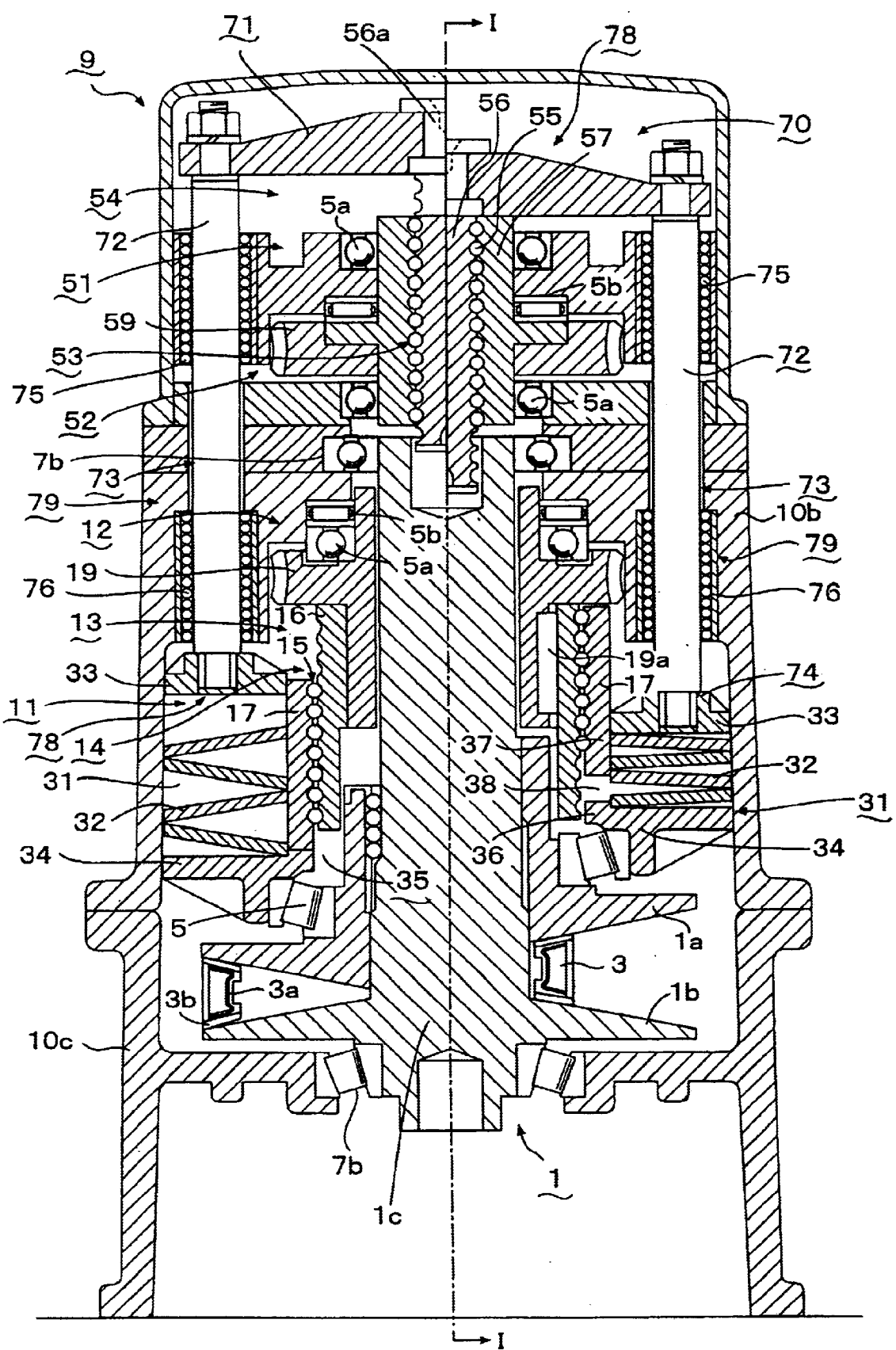
FIG. 2 is a sectional view of an input pulley and an input operating unit in the first embodiment.
Figure 3:
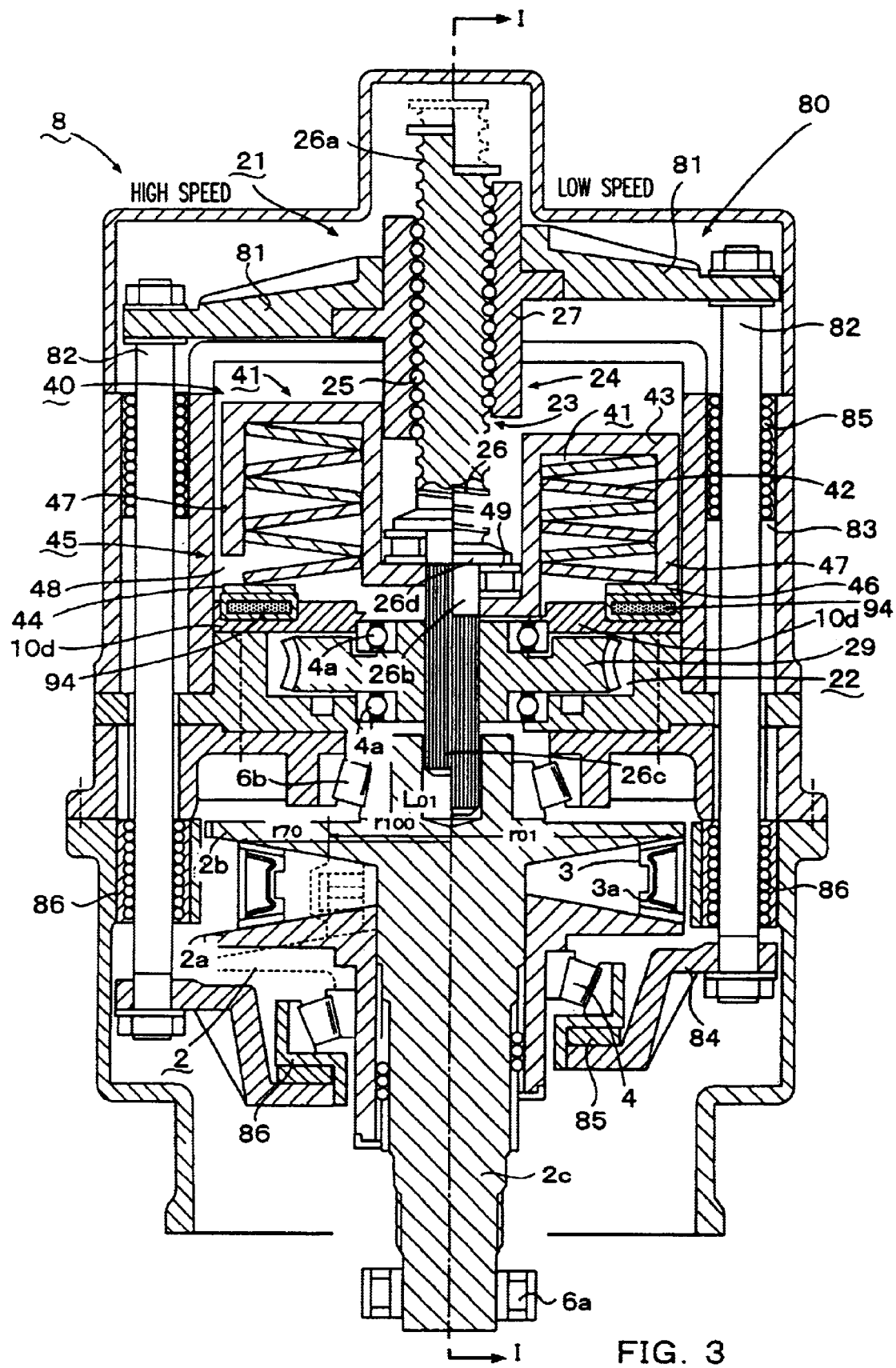
FIG. 3 is a sectional view of an output pulley and an output operating unit in the first embodiment.
Figure 4:
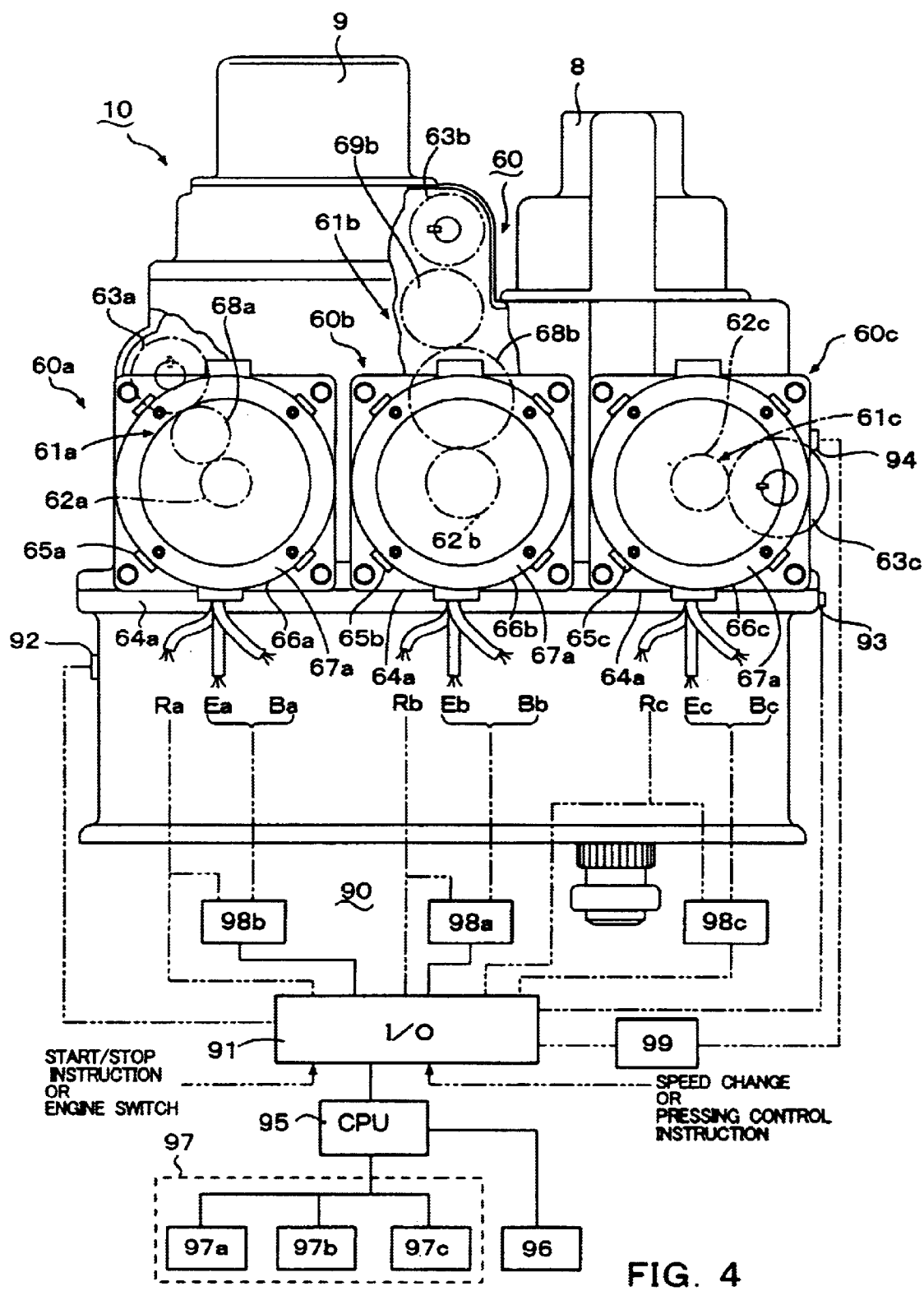
FIG. 4 is a constitutional view of a driving source and a controlling device for each operating unit in the first embodiment.

Referring to FIGS. 1 to 6, a continuously variable transmission 10 comprises a variable speed transmitting device 10A comprising a belt 3 extended between an input pulley 1 and an output pulley 2, and a variable speed control device 10B for controlling an input operating unit 9 and an output operating unit 8 by a controlling device 90 shown on the plane side of FIG. 4. In the present embodiment, the input operating unit 9 has an individual pressing device 50 comprising a first and a second input pressing devices 11 and 51, and the output operating unit 8 has a composite pressing device 40 comprising an output pressing device 21, which are energized by a driving source 60. The pressing devices 11, 51 and 21 have compressing devices 14, 54, and 24, respectively, and operate an input contact device 35, an input elastic device 31, and an output composite device 20, respectively. The input operating unit 9 and the output operating unit 8 are able to distinguish and supply the elastic force and the pressing force to the input pulley 1 with the pressing devices 11 and 51 and to the output pulley 8 independently with the pressing device 21 respectively according to the speed ratio.

Since substantially equivalent functional parts are present on the input and output sides, in the present specification, "input" and "output" are attached to the names of parts when they need be distinguished each other they are omitted (when they can be understood from the descriptions and drawings).

The variable speed transmitting device 10A has conically molded movable disks 1a and 2a and fixed disks 1b and 2b opposed to each other and includes variable pitch pulleys 1 and 2 disposed so that the former can be slidably moved relative to the latter in a direction of a diametrically central part via a key, which are disposed on an input shaft 1c and an output shaft 2c, respectively, reversibly to each other. The pulleys 1 and 2 are journalled in a pair of bearings 7 and 6, respectively, and rotated, and the movable disks are pressed and operated by the pressing devices 11, 51, and 21 while separating the rotating force by a pair of bearings 5 and 4 between the main body 10 and the movable disks 1a and 2a. The main body 10 has a first main body 10a receiving therein other transmitting devices such as a vehicle and has a second main body 10b receiving therein the continuously variable transmission 10 separably mounted thereon.

Figure 7:
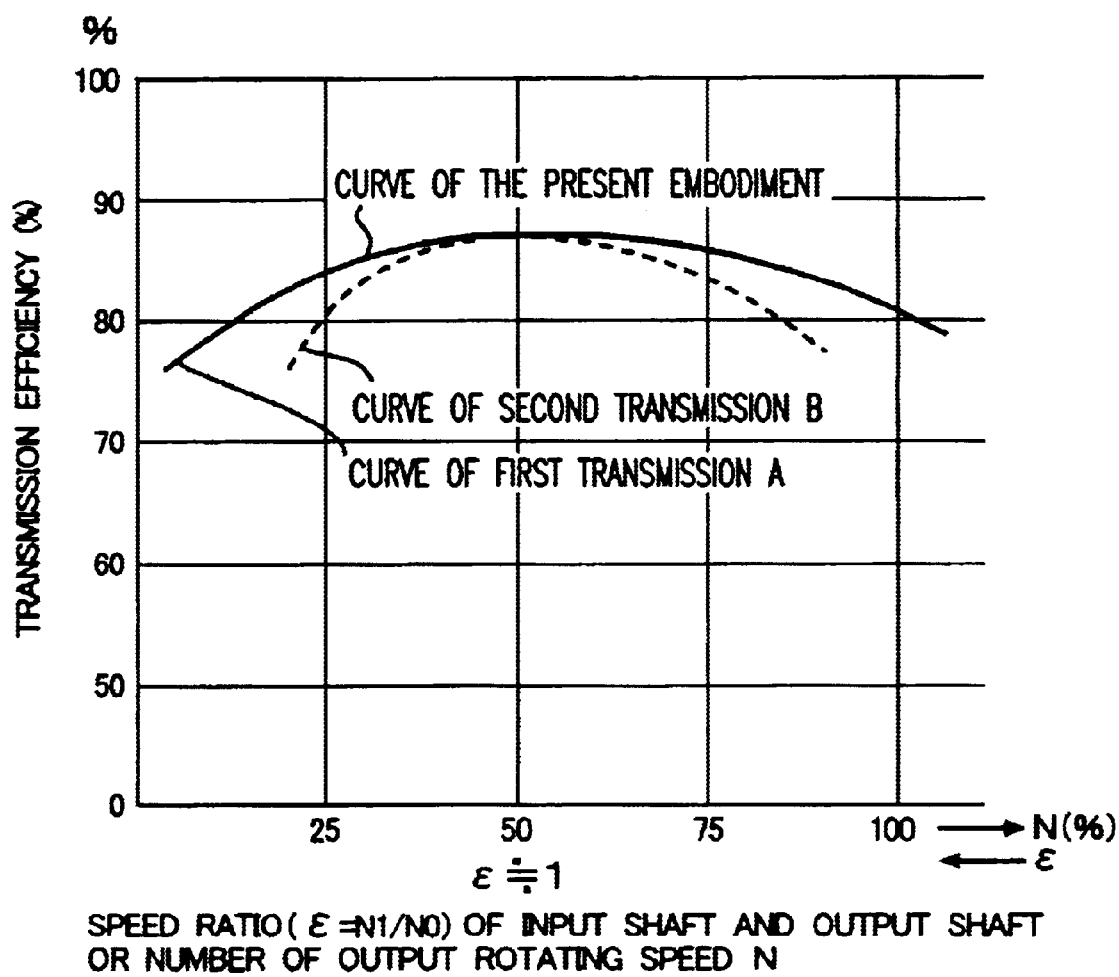
FIG. 7 shows the speed ratio-to-transmitting efficiency characteristics in the first embodiment.

For a V-belt 3, there are known two kinds of belts, i.e., a tension type and a compressing type in which an input pulley tenses and transmits an output pulley, and an input pulley compresses and transmits an output pulley, respectively, both of which can be applied to the present invention. The construction of these types is not explained herein, but there are merely mentioned U.S. Pat. No. 4,493,681 for the former and U.S. Pat. No. 3,949,621 for the latter. In the light of an idea of the present embodiment, particularly, even the tension belt performs the stable transmission without taking measures to compensate for the unstable friction force of a cam mechanism or the like, and therefore, there is illustrated a tension type belt 3 having a construction for encircling a metal core 3a with a composite material 3b such as heat resistant resin, ceramic, metal or the like. The variable speed transmitting device 10A performs the power transmission of constant horse power with high efficiency in the whole area of wide ratio area as shown in FIG. 7 by operation of the variable speed control device 10B described below.

The operating units 9 and 8 are capable of individually distinguishing and supplying the pressing force or elastic force to the movable disks 1a and 2a of the corresponding pulleys 1 and 2 according to a control instruction. That is, the supply of the pressing force and the supply of the elastic force respectively cause the corresponding pulley to have the reference function and the follower function. The reference function and the follower function termed herein refer to the function in which the setting of the stable factor at the time of friction transmission is determined on the reference side, and the unstable factor is self-converged and set on the follower side. That is, the reference function is the function for determining the reference position of the belt at the time of friction transmission to decide the rotating speed and the speed ratio, and means the positioning control of a pulley V groove for determining the belt contact radius. This is the function that at the time of speed change operation, the pressing force is applied from the pulley to the belt to position and control a variable pitch, but when the speed ratio is determined, the application of the pressing force is also substantially stopped and the position of the V groove caused by the movable disk is fixed to thereby form the V groove under the same condition as that of the normal constant ratio pulley. The follower function means the variable pressing control for always supplying and maintaining the required friction force between the belt and the pulley totally irrespective of the aforementioned positioning control even if erroneous factors such as the abrasion of the contact surface between the belt and the pulley, the internal and external disturbances and impact vibrations or the like should occur, and is the function of performing, by the aid of the elastic force, self-settling or automatic aligning for momentarily returning the erroneous factors to the normal transmitting state to decide the shaft torque of shafts.

The input operating unit 9 in the present embodiment is composed of an individual operating unit comprising a first input pressing device 11 for supplying a pressing force to the input pulley 1, a second input pressing device 51 for supplying an elastic force to its pulley 1, an input pressing device of an individual pressing device 50 individually provided, and driving sources 60a and 60b. The first pressing device 11 is of a series construction of a contact device 35 and a first compressing device 14, and the second pressing device 51 is of a series construction of an elastic device 31 and a second compressing device 54, both of which press the movable disk 1a of the pulley 1 via common sliding member 36 and a bearing 5. The contact device 35 and the elastic device 31 are arranged in parallel on the same shaft and the same core circle in the outer periphery of the disk 1c of the input pulley 1, and the compressing devices 14 and 15 are coaxially disposed longitudinally. Accordingly, in the pressing form of the pressing devices, the device 11 transmits pressure to the disk 1a from the inner wall of the second main body 10b, and the device 51 transmits pressure to the elastic device 31 via a pressure transmitting device 70 shown in FIG. 2 from the outer wall thereof.

The compressing devices 14 and 54 of the pressing devices 11 and 51 comprises sliding devices 13 and 53 and urging devices 12 and 52 for urging them. The sliding devices 13 and 53 have two pairs of sliders 16, 17 and 56, 57, and pressing means 15 and 55 caused to slide therebetween, and are, in the present embodiment, ball screws. The sliding device 13 is in the form of a pipe and positioned in the periphery of the input pulley 1, and the sliding device 53 is in the form of a rod and positioned on the extension of the disk 1. The urging devices 12 and 52 are, in the present embodiment, composed of a worm transmitter comprising worms 18 and 58 and wheels 19 and 59, and when a instruction is input into the disks 18a and 58a so that the sliding devices 13 and 53 are positioned, the urging devices perform the self-locking function for maintaining the aforesaid position even if a supply of a control instruction is stopped. The pressing devices 11 and 51 press the disk 1 in the non-rotational state between a taper roller 5 and a thrust bearing 5b. The external-thread slider 16 via a key 19a of a gear 19 and the internal-thread slider 57 directly connected to a gear 59 are not slidably moved up and down with the rotation, and in the pressing device 11 and the pressing device 51, the slider 17 and the slider 56 respectively move up and down.

The contact device 35 of the first pressing device 11 comprises two sliders 36 and 37 disposed via a clearance 38, and the state of the contact motion for placing both of them in contact with each other according to the operation of the compressing device 14 and the state of releasing the contact for parting one from the other are controlled. Since the compressing device 14 directly applies the pressing force to the input pulley 1 through the sliders 36 and 37 and the bearing 5 at the time of the contact motion, the pulley 1 performs the reference function for the variable pitch positioning control. At the time of releasing the contact, the clearance 38 is produced so that the compressing device 14 is not act on the input pulley 1. In the present embodiment, the slider 37 is used common to the slider 16 of the compressing device 14, and the slider 36 is used common to the slider 34 of the elastic device 31. Numeral 77 designates a stopper for impeding a rotation.

The elastic device 31 of the second pressing device 51 comprises an elastic member 32 in the form of a series construction of four dish springs and two sliders 33 and 34 for pressing the former at both ends thereof, and is coaxially arranged in the outer periphery of the contact device 35. The elastic member enables the transmission of elastic vibrations at one end and disenables that at the other end, and makes both ends thereof being slidable, so to be supported in a floating state. In the present embodiment, as shown in FIG. 2, the elastic device 31 has a pressure compressing device 70 disposed therebetween with the compressing device 51 supplies an elastic force resulting from the series compression of the elastic member 32. Therefore, the pulley 1 performs the follower function for the variable pressing control. Accordingly, the pressing force of the first pressing device 11 and the elastic force of the second pressing device 51 are applied in parallel to the pulley 1 via the common slider 34 and the bearing 5.

The pressure transmitting device 70 shown in FIG. 2 comprises a lateral transmitting means 78 comprising a first transmitting means 71 connected to an end 56a of the slider 56 of the compressing device 54 and extends left and right in symmetry from a-center pressure receiving point and a first transmitting means 74 jointly serving as the slider 33, a longitudinal transmitting means 73 comprising two pressing shafts 72 connected to both ends of the lateral transmitting means 78 being parallel with the axial direction of the slider 56, and a support device 79 comprising a bearing for guiding the sliding direction of the pressing shafts 72 and 72 of the elastic device 31 and a through hole. The means 71, 72 and 73 are formed into a square frame, and the shafts 72 and 72 are supported by the body 10d through linear ball bearings 75 and 76 for maintaining the square shape even under high presser in the same direction as the slider 56. In the present embodiment, the slider 33 and a pressing ring 74 are used in common, and the elastic device 31 is pressed in series.

The output operating unit 8 shown in FIG. 3 is composed, in the present embodiment, of a distinguishing operating unit in which both supply of pressing force and supply of elastic force to the output pulley 2 are distinguished and supplied according to a control instruction to a single output pressing device 21. Unlike the operating unit 9, there is an output pressing device 21 in which a composite device 40 having the output elastic device 41 and the output contact device 45 mounted in parallel is further mounted in series by a single output compressing device 24. The compressing device 24 comprises a sliding device 24 comprising two sliders 26 and 27 and a ball-thread pressing means 25, and an urging device 22 of a transmitter of a worm 28 and a wheel 29. The compressing devices 24 and 54 are different in that the sliding device 53 is pressed in right-hand thread while the sliding device 23 is pressed in left-hand thread, that the slider 56 moves up and down with non-rotation while the slider 26 rotates and moves up and down because of which the bearing 49 is disposed, that the entire compressing device 54 is installed not to be vibrated on the body 10b but in the compressing device 24, only the sliding device 23 is supported in the interlocking state capable of vibrated and transmitted in the direction of the diametrically central part between the output pulley 2 and the elastic device 41 or in the floating state because of which the slider 26 extends and arranges spline-coupling relative to the wheel 29 of the urging device 22 to enable rotation and transmission.

An elastic device 41 pressed via the bearing 49 comprises a slider 43 formed in an annular pan, and an elastic member 42 comprising a plurality of plate springs received and pressed relative to the slider 44. In the present embodiment, the elastic member 32 in FIG. 2 and the elastic member 42 in FIG. 3 are disposed on the pulley side and on the body side, respectively. The elastic members 32 and 42 have one end supported in a manner capable of being elastically vibrated and the other end supported in a manner not capable of being vibrated to carry out effectively the suppression of vibrations at the pulley friction transmitting surface. The contact device 45 comprises sliders 45 and 47, and in the present embodiment, the slider 47 is used in common at the pan-like outer edge of the slider body 43, and the slider 46 is used in common at the slider body 44. FIG. 3 shows, in the left half of the center line, that the clearance 48 is present at the time of the light load of the elastic device 41, and the contact device 45 distinguishes and supplies the elastic force to the pulley 2 in the state of releasing the contact, and in the right half, that the elastic device 41 exceeds a fixed value and the contact device 45 distinguishes and supplies the pressing force to the pulley 2 in the contact motion state. In the contact motion stat in the present embodiment, the elastic force Pso of the elastic member 42 is changed into the pressing force and the minimum friction force is always supplied to the pulley 2 to ensure the stability of continuous output torque at the time of switching.

Figure 5:
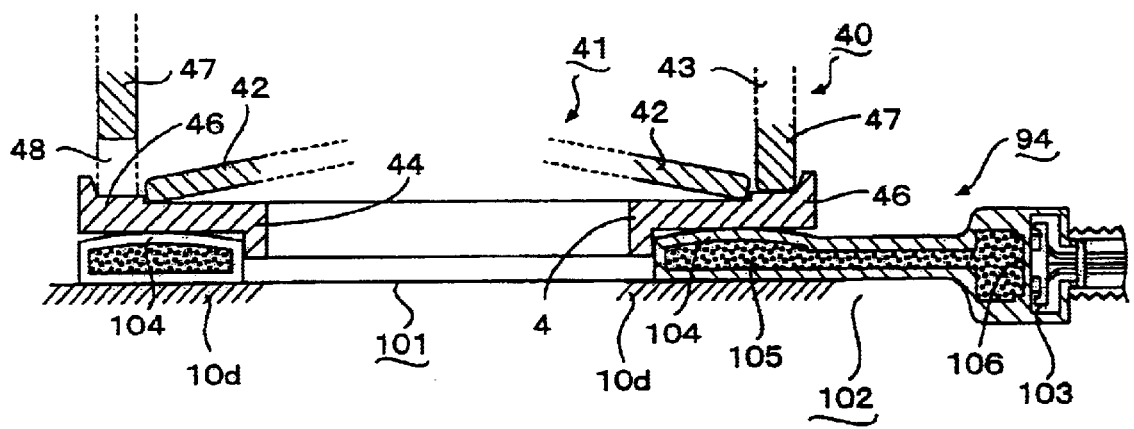
FIG. 5 is a sectional view of a pressure detector applied to an output operating unit in the first embodiment.

The pressing device 21 also has a pressure transmitting device 80 formed in a square shape symmetrical to left and right comprising a longitudinal transmitting means 83, a lateral transmitting means 88, and a supporting means 89, which has the same construction as the pressing device 51, description of which is therefore omitted while attaching the similar reference numerals thereto. The difference is that in the present embodiment, all pressing mechanism is disposed behind the fixed disk 2b to transmit elastic vibrations mutually. FIG. 5 is a sectional view of a pressure detector 94 disposed between the body 10d of the pressing device 21 and one end of the composite device 40. The pressure detector 94 comprises an annular detecting end 101 capable of simultaneously compressing a liquid-sealed main diaphragm 104 with the annular elastic member 42 and the slider 47, a deriving end 102 which extends radially from one part of the detecting end 81 to displace a sub-diaphragm 106, a pressure-electric signal converting part 103 disposed at one end thereof and having a semiconductor strain gauge, and an oil medium 105. The values of not only the applied elastic force or pressing force but also the friction force at the output friction transmitting surface at the fixed pitch operation is detected appropriately and controllable.

As shown in FIG. 4, the operating units 8, 9 individually provide driving sources 60a, 60b and 60c for the pressing devices 11, 51 and 21 so that control instructions are individually supplied from an electronic controlling device 90. Each driving source 60 has a gear head 64, a DC servo reversible motor 65, a brake 66, and an encoder 67, which are indicated by reference numerals with characters a, b and c attached thereto. Both the operating units require mutually synchronized control, but the moving operating amount of the compressing devices 14, 54 and 24 are different from one another, and therefore, a control signal provided to the corresponding shafts 18a, 58a and 28a which have gear transmitters 61a, 61b and 61c different in pitch and provided individually, from the controlling device 90, makes gears 68 and 69 set as necessary.

The controlling device 90 inputs and outputs input and output information via an input/output device 71 having, as main elements, a CPU calculation device 75 and memory systems 96 and 97 composed of various RAMs, ROMs, converters such as A/D, D/A, etc. a transmission bus. Input information include a start instruction of the transmission 10 such as a status switch of the engine or the like, a speed change or pressing control instruction, the rotating speed of rotating speed detectors 72, 73 of the pulleys 1, 2 shown in FIG. 1, a belt/pulley contact pressure via a filter 99 from the pressure detector 94, and encoder operating amounts Ra, Rb, and Rc. Output information include operating instructions Ea, Eb, and Ec to the motor 65, and brake instructions Ba, Bb, and Bc.

The memory system 96 has fundamental information in which an operation processor 95 executes a programmable control. The memory system 97 comprises three processing information; and memories 97a, 97b, and 97c store therein control information in advance at the times described below respectively, that is, when the pulley 2 is operated by the reference function with the pulley 1 being the follower function, control information when the pulley 2 is operated by the follower function with the pulley 1 being the reference function, operating information when both the pulleys are switched in function, and control information when the operating units 8 and 9 are individually and singly operated. The filter 99 removes the elastic vibration portion from the elastic force. The aforementioned driving sources 60 and various devices of the controlling device 90 are omitted in their description because they have been already disclosed in, for example, "Servo System General Catalog" published by Sanyo Denki Ltd. and are available in market. The operation of the first embodiment will be described hereinafter. The basic idea of the present embodiment is the pressing force or the elastic force from the corresponding operating unit is distinguished and controlled to be supplied when the contact radius between the belt and the pulley is large, the pulley is operated as the reference function, and when the contact radius between the belt and the pulley is small, the pulley is operated as the follower function, with respect to any of the pulleys of the input or output pulley. In the present embodiment, the speed ratio $\epsilon(=N1/N0)$ of the input and output rotational frequencies N1, N0 is switched with $\epsilon=1$ being a reference. That is, motion forms of both the operating units 8 and 9 are switched so that the operation is accomplished by the first transmitting device A for imparting the follower function to the input pulley 1 and the reference function to the output pulley 2 when the variable area is in the large ratio area of $\epsilon>1$, and conversely the operation is accomplished by the second transmitting device B for imparting the reference function to the input pulley 1 and the follower function to the output pulley 2 when the variable area is in the small ratio area of $\epsilon<1$. It is assumed that since in FIG. 1, the input pulley 1 has the minimum radius r 10, and the output pulley 2 has the maximum radius r 00, the operating unit 9 supplies the elastic force of the elastic device 31 when the contact device 35 is in the contact release state, and the operating unit 8 supplies the pressing force of the compressing device 24 when the contact device 45 is in the contact motion state, to form the first transmitting device A, during the transmitting of which a speed increasing instruction is supplied.

Figure 6A:
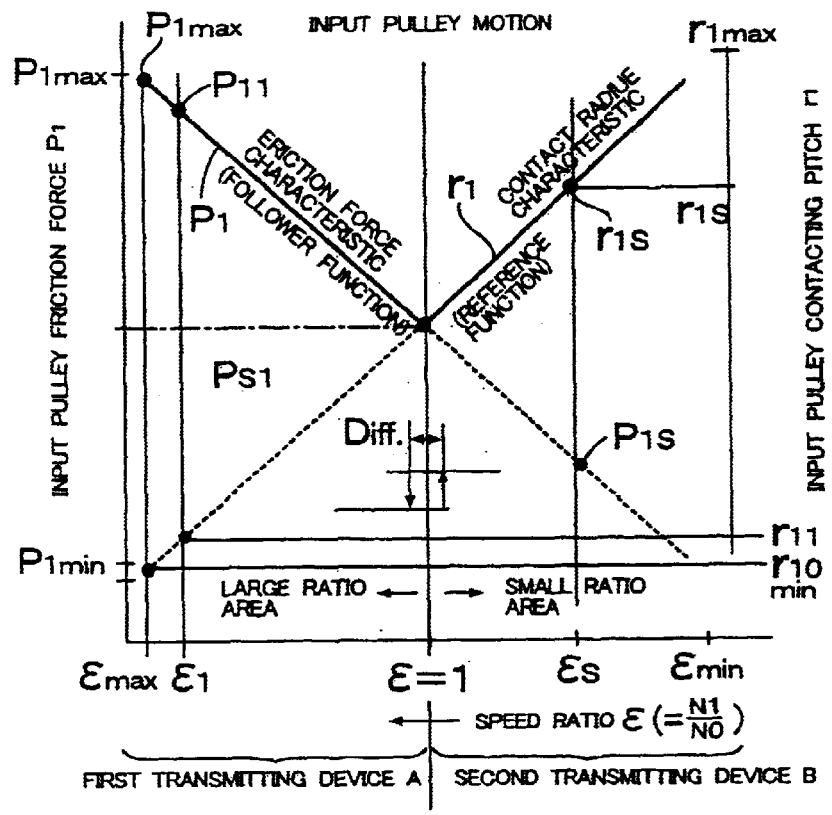
FIGS. 6A and 6B show the speed ratio-to-contact radius and the friction force characteristics, FIGS. 6A and 6B illustrating motion characteristics on the sides of the input and output pulleys, respectively, in the first embodiment.
Figure 6B:
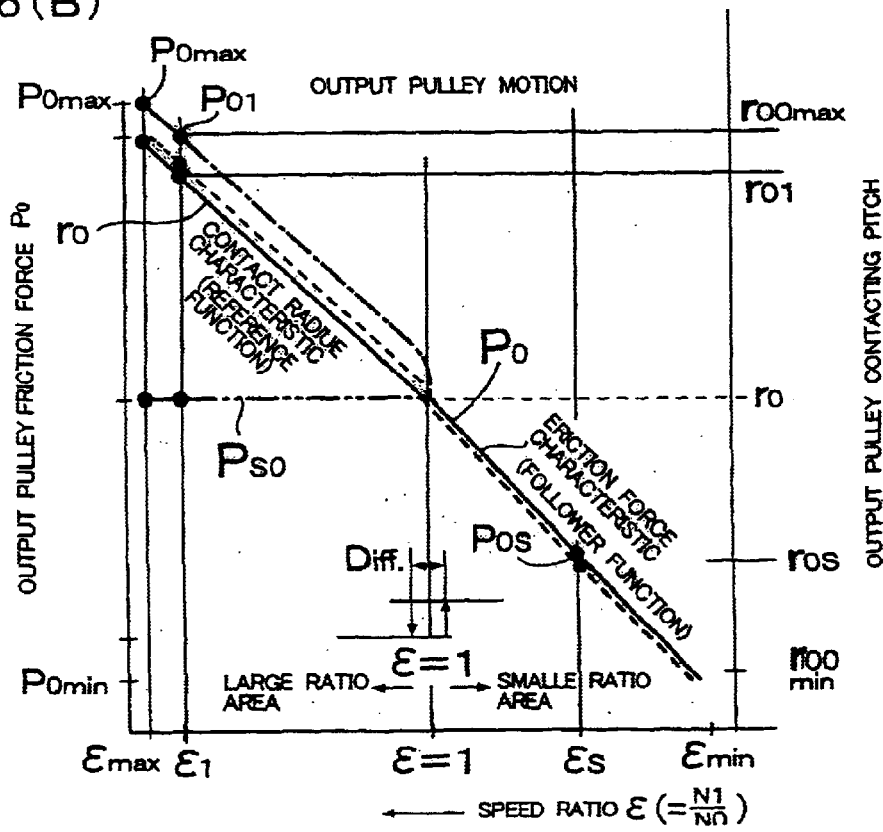

FIG. 6 is a motion characteristic view showing the speed ratio $\epsilon$ of the speed change area on the axis of abscissa, and the friction force P and the contact radius r between the belt and the pulley on the axes of left and right ordinates, respectively, FIGS. 6A and 6B respectively showing the characteristics of the input pulley and the output pulley. At start, the maximum friction force is applied by the maximum compressing pressure of the elastic member 32 to the input pulley 1 for the maximum speed ratio max. The V groove of the output pulley 2 is assured of the maximum friction caused by tension via the V belt 3 of the maximum tension. In the case of the present embodiment, even when the output contact device 45 is being operated in contact, the pressing force of the elastic member 42 is continuously supplied with the fundamental pressure Pso indicated by the two-dot contour line in FIG. 6 via the bearing 49, the sliding device 23 and the pressure transmitting device 80. Accordingly, the friction force of the output pulley 2 will be the maximum value P0 max in which the belt tension and the fundamental pressure Pso are superposed. When the speed increasing instruction is applied and the three motors 67 are actuated, the worm shafts 18a, 58a and 28a rotate so that on the input pulley side, the clearance 38 of the contact device 35 is narrowed but no influence is exerted, and since the elastic member 32 is reduced in compression to P11 as shown in FIG. 6 by the compressing device 54, the supplied elastic force reduces, and the input friction force also reduces. Since the friction force portion caused by the belt tension is reduced on the output pulley side, the output friction force is also reduced to P01, and at the same time, the composite device 40 remains unchanged by the compressing device 21, and only the sliders 26 and 27 of the compressing device 21 are relatively displaced so that the movable disk 2a is forcibly moved by the supplied pressing force via the pressure transmitting device 80 to reduce the belt radius to r 01. At the same time, the radius r 10 of the input pulley 1 is increased to r 11, despite the reduction in pressure, by the function of the elastic force. This series of motions are simultaneously and synchronously carried out. Thereafter, when the speed increasing instruction is applied again in a manner similar to that mentioned above, the same motion is repeated till reaching the speed ratio=1.

When the speed increasing instruction further reaches $\epsilon=1$, the motions of the two operating units 8 and 9 are momentarily switched. That is, on the input side, the clearance 38 slightly left of the contact device 35 is momentarily erased responsive to a switching instruction, the sliders 36 and 37 are placed in the contact motion state, and the elastic force of the elastic member 32 is preferentially switched to the pressing force of the contact device 35. On the output side, the slider 26 is moved up by the function of the urging device 22 to reduce in pressure the composite device 40, so that the contact device 45 is placed in the contact release state from the pressure detector 94, and the elastic force of the elastic member 42 is transmitted to the pulley 2 through the sliding device 23 and the pressure transmitting device 80. Accordingly, in the small ratio area of ε<1, there can be operated as the second transmitting device B in which the input pulley 1 increases the contact radius to provide the reference function and the output pulley 2 reduces the contact radius to provide the follower function. In the first transmitting device A, the output rotating speed is directly controlled by the output operating unit 8, and the output torque is indirectly controlled via the belt tension by the input operating unit 9, as compared to which in the second transmitting device B, the output rotating speed is indirectly controlled by the operating unit 9 and the output torque is directly controlled. Accordingly, thereafter, the stable transmission is continuously accomplished in the exactly similar manner except the control instructions and the compensating signals are supplied and switched by the controlling device 90. FIG. 3 shows in its left half the state of the output pulley 2 and the pressing device 21 in which the speed increasing instruction is further applied to provide the speed ratio εs at the output rotating speed. The same motion takes place till reaching the minimum speed ratio ε min.

Figure 1:
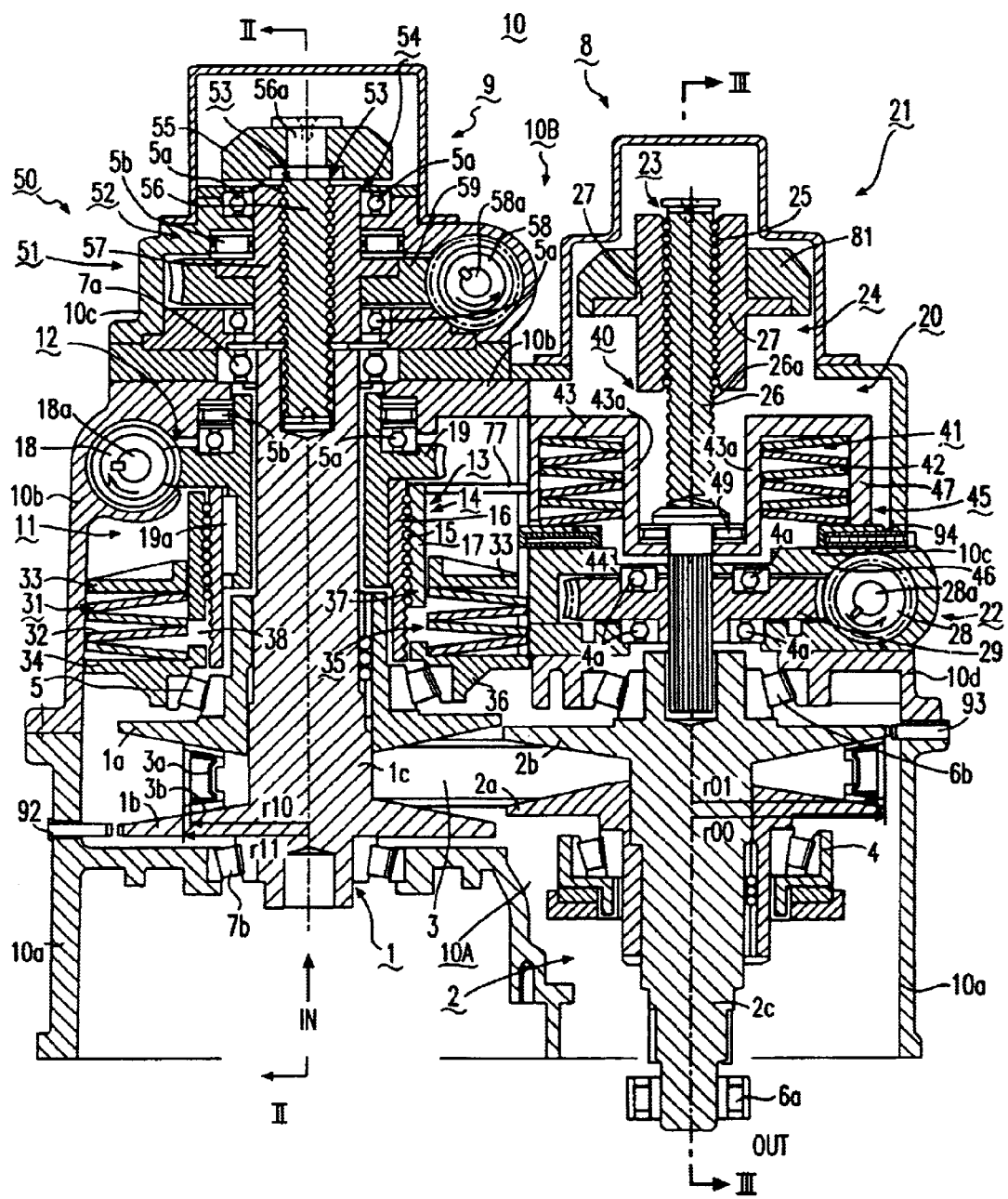
FIG. 1 is a sectional view of the entire constitution of a continuously variable transmission according to a first embodiment of the present invention.

Conversely, in order to return to the maximum speed ratio ε max again, a reduction instruction reversed to that as mentioned above is given to the motor 65 thereby achieving the motion procedure reversed to that as mentioned above. In the switching of function at the speed ratio ε=1, in order to eliminate the bad influence of the change after passage in respect of the longitudinal extension and widthwise thickness of the belt 3, in the present embodiment, the controlling device 90 supplies a switching instruction to the pressing devices with the speed ratio signal ε always calculated from the input and output pulley rotating speed detectors 92, 93 being a reference. And yet, actually, in order to impede hunting between the transmitting devices A and B in the vicinity of the speed it ratio ε=1, the instructions are controlled applying a motion differential as shown in FIGS. 6A and 6B. In the foregoing, since only one of the elastic device 31 or the contact device 35 of the operating unit 9 does not influence on the pressing of the pulley 1, both the compressing devices 11 and 51 need not be driven always, but a supply of a control instruction during that period may be stopped as in the left slider shown in FIG. 2 for standby, and only at the time of switching or upon applying a pressing force, both of them may be driven simultaneously. Further, when the compression value of the elastic members 31 and 41 is deteriorated in settling, the fixed friction force cannot be likely maintained by the pulleys 1 and 2, However, in the present embodiment, even when the transmitting operation in the maximum speed ratio state shown in FIG. 1 is being stopped, a pressure removing instruction for forcibly releasing the high pressing of the pressing devices 51 and 21 to the low pressing is given to the driving sources 60b and 60c to release the pressing when the operation is stopped for a long period, thus enabling application of measures for impeding the deterioration after passage of time. Further, in each amplified 98, the DC motor 67 can be quickly switched by the supplied voltage or the operation of pulse amount only at the time of switching both the operating units, and an instantaneous motion instruction may be supplied to switch the function.

Further, in the present embodiment, the output torque is sometimes achieved by the indirect pressing control of the input operating unit 9, but even when the elastic members 32 and 42 are deteriorated, the desired friction force of high accuracy is assured by the output pulley 2, and therefore, the pressure detector 94 is used. Even when the output pulley 2 is operated by the reference function, the wedge friction force can be always detected by the detector 94. With respect to the control of compensation for the lowering of the friction force, the deterioration of the elastic member 31 is detected in advance, and open loop or closed loop control is applied to the input operating unit 9 so as to be suitable to the friction force determined by the CPU 71 and the memory 77a, thereby achieving the fixed supply of the friction force. Detailed measures therefor are outside the gist of the present invention, description of which is omitted. The same is true for the case where use is made of the rotating speed detector 93 is used when the output rotating speed is done by the indirect positioning control of the input operating unit 9.

The effect of the present embodiment is as follows: When the contact radius or area between the belt and the pulley of both the pulleys 1 and 2 is reduced, the high pressure elastic force is always maintained to be supplied, and therefore, the slip caused by the short of pressing is overcome; when the contact radius or area is increased, the pressing force is not applied at all except the speed change motion or the slight pressing force Pso is merely applied, and therefore, the variation in friction coefficient and the unstabilization of surplus friction force are not brought forth, thus overcoming the poor transmission resulting from the rolling-in phenomenon of the belt caused by the external pressing more than as needed. Therefore, the "substantial non-pressing" termed in the present specification means that the controllable elastic force within the range free from bad influence on the friction transmission may be applied. As a result shown in FIG. 7, the large ratio area in the transmission A and the small ratio area in the transmission B can be merely stabilized but both the areas can be considerably enlarged as a single transmittable area of the transmission since the two areas each performing higher efficiency are combined by the role of a switching means, and since the stable maintenance of the desired friction force is established, the high efficient transmission can be attained even at both end areas of the speed change area. Moreover, the greatest merit lies in that since the belt rolling-in phenomenon is overcome, not only the known compression type belt shown by the dotted line in FIG. 3 but also the tension type belt shown by the solid line can be applied without provision of an automatic adjusting means such as a cam mechanism. It is noted that a function switching position of each operating unit is not always restricted to the speed ratio ε=1, it can be changed to a suitable speed ratio, and switching can be made with the output rotating speed being a reference without depending on the speed ratio.

Second Embodiment

Figure 8:
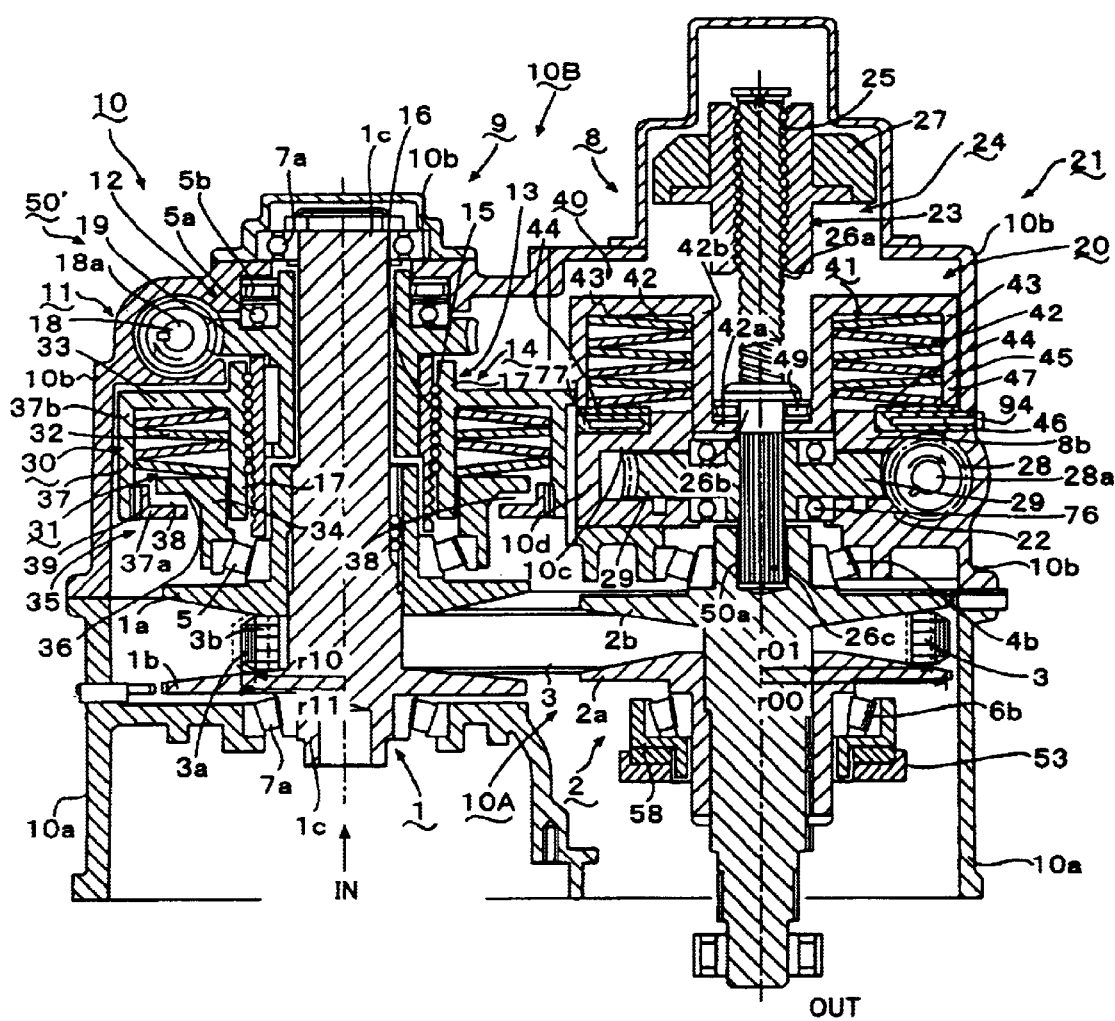
FIG. 8 is a sectional view of the entire constitution of a continuously variable transmission according to a second embodiment of the present invention.
Figure 9:
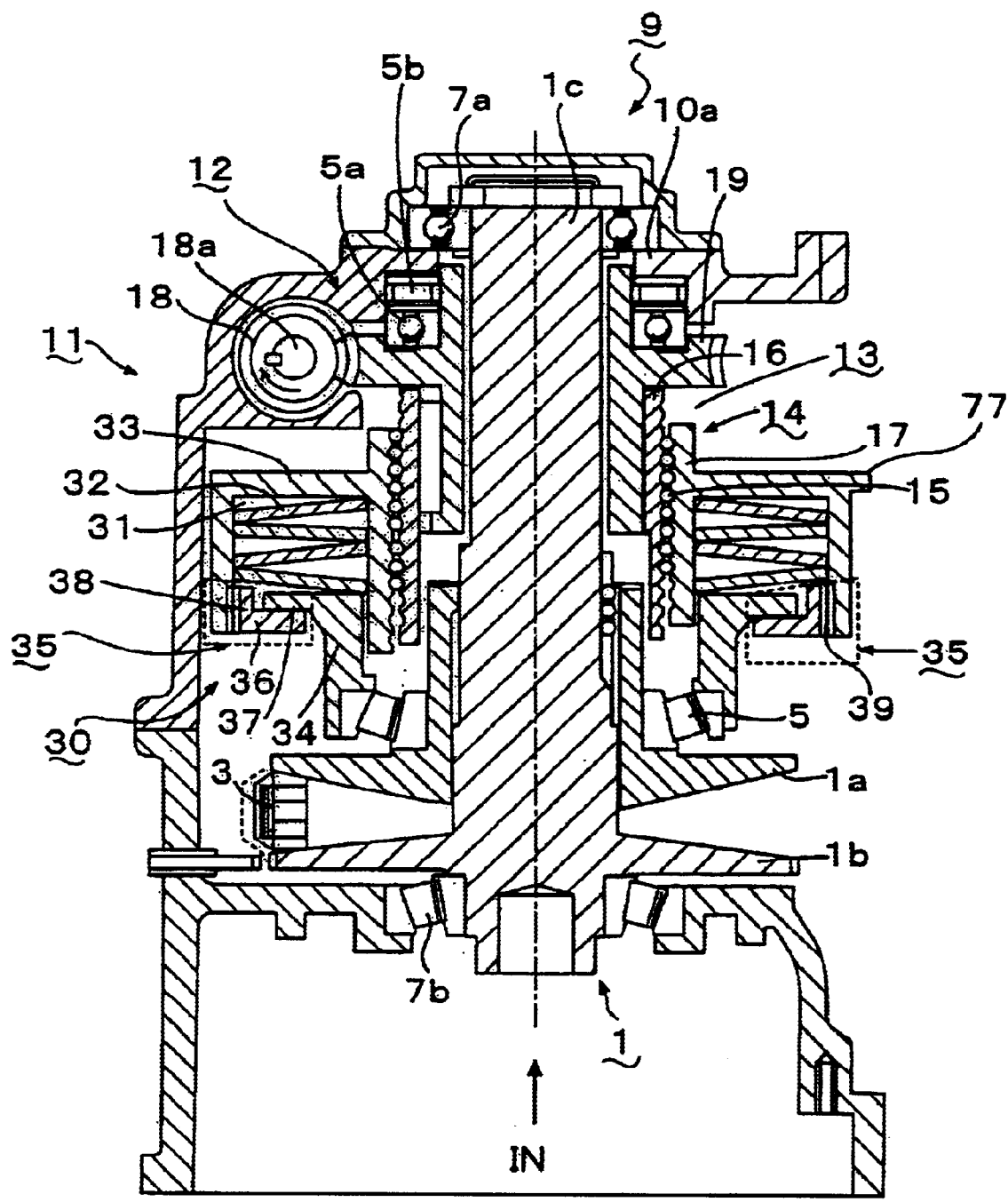
FIG. 9 is a sectional view of an input pulley and an input operating unit in the second embodiment.

FIGS. 8 and 9 show a continuously variable transmission according to the second embodiment. The second embodiment is different from the first embodiment merely in the constitution of the input operating unit 9, and the substantial variable pressing control by the function switching of the first and second transmitting devices A and B and the variable pitch positioning control motion are entirely the same. So, members having the same or similar function are indicated by the same reference numerals as those of the first embodiment, and the different points will be described. The difference in construction is that similarly to the operating unit 8, the input pressing device 11 of a composite pressing device 50' is formed by a series connection of the single compressing device 14 and the composite device 30. In the composite device 30, the elastic device 31 and the contact device 35 are compressed and mounted in parallel, in advance. In the present embodiment, the slider 17 of the sliding device 13, the slider 33 of the elastic device 31, and the slider materials 37 of the contact device 35 are integrated for common use to form an annular pan type receiving frame both ends of which are closed in the compressed state, unlike the composite device 40. A plurality of elastic members 32 in the form of a dish spring are received into the chamber, and the elastic members 32 are compressed and received by the sliders 36 and 37 serving as the slider 34. The input elastic member 32 and the output elastic member 42 respectively carry the high pressing area characteristic P1 and the low pressing area characteristic PO, as indicated by the solid lines of the friction force characteristics of FIGS. 6A and 6B. Therefore, similarly to the first embodiment, normally, the former has a dish spring of greater elastic compression pressure selected than the latter, but it may be changed also by the friction coefficient between the belt and the pulley. The slider 37 is formed with threads 39 between the movable member 37a and the movable member 37b, so that the motion point in the contact or release state of the contact device 35 can be adjusted. The contact device 45 may be constituted similarly.

The difference between the composite devices 30 and 40 is that the compression motion direction of the elastic members are reversed to each other. The composite device 30 is of an elastic member closed type in which the former is compressed and received in advance, but the device 40 is of an open type. Also in terms of motion, during the motion of the transmission 10 in the first transmitting device A, the operating unit 8 positions and controls the belt 3 similarly to FIGS. 6A and 6B, and therefore, in the contact device 35, the clearance 38 in FIG. 8 is formed so that the elastic member 32 is effectively functioned. However, shifting to the second transmitting device B, the operating unit 8 enters the variable pressing control area of the elastic force, and at the same time, also in the contact device 35, the clearance 38 disappears, and the operating unit 9 shifts to the contact motion state shown in FIG. 9. Therefore, in the small ratio area, the function of the elastic member 32 becomes substantially invalid, and the pulley 1 takes the reference function and operates. Of course the operating order of the transmission can be selected optionally. The belt 3 shown is of a compression type comprising an endless belt 3a and a number of blocks 3b.

The effect of the present embodiment is substantially similar to that of the first embodiment, but a further miniaturization and lighter configuration can be achieved. However, since the composite device 30 is of a closed type, the elastic member 32 having measures for impeding deterioration cannot be removed in pressure during the stoppage of the transmission, but even if in the elastic member 32, the change after passage of year occurs in the compressed pressure, the pressure detector 94 is used for the output torque control so that the CPU 95 and the memory 97c always controls the fixed friction force in the output pulley 2, and therefore, the trouble in the reduction in deterioration of the elastic force can be overcome by the compensating operation for increasing the operating amount of the input operating unit 9. It withstands a long-term transmission with less deteriorated elastic members without the detector, and re-adjustment can be made by the screw 39.

Third Embodiment

Figure 10:
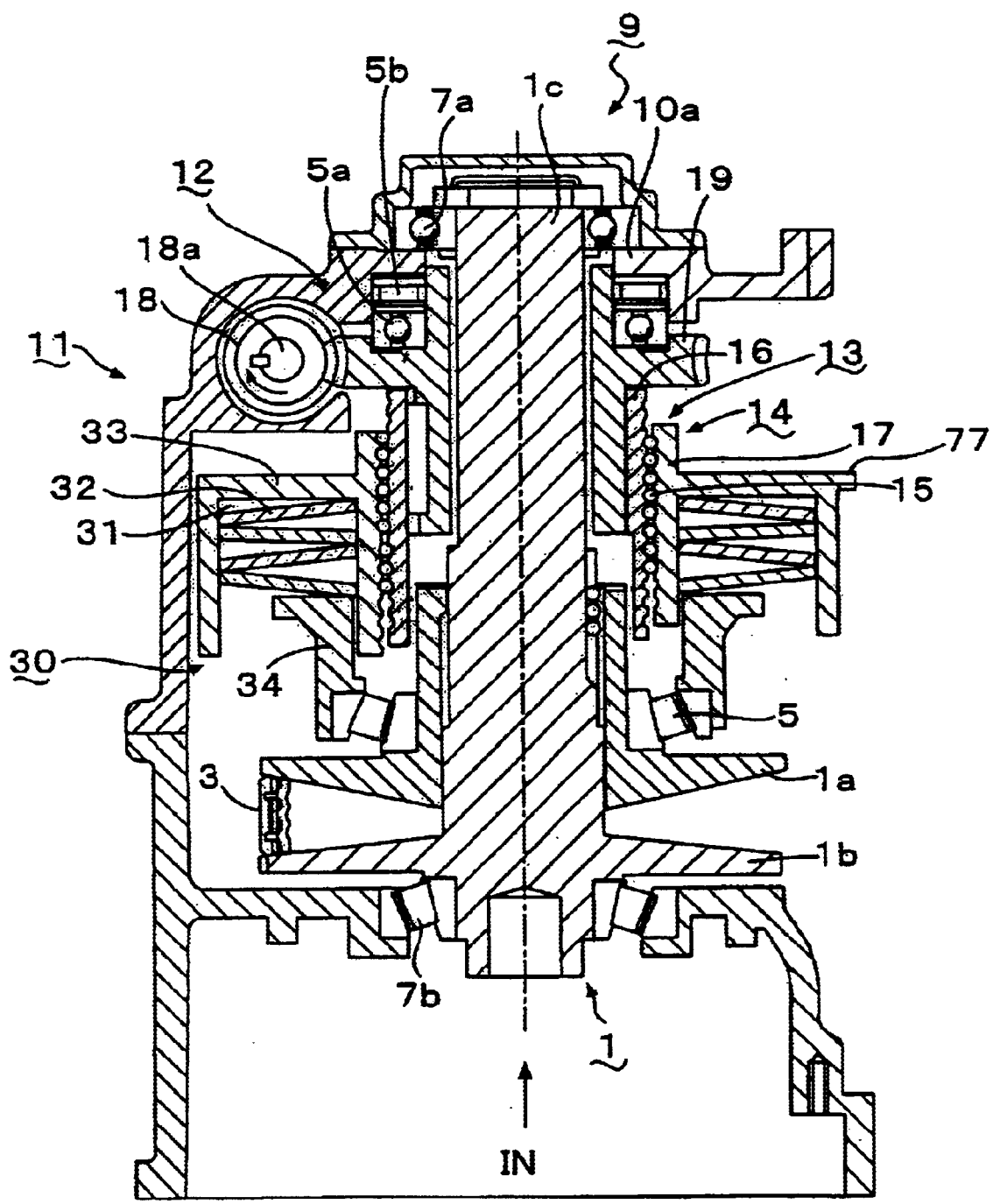
FIG. 10 is a sectional view of an input pulley and an input operating unit of a continuously variable transmission according to a third embodiment of the present invention.
Figure 11:
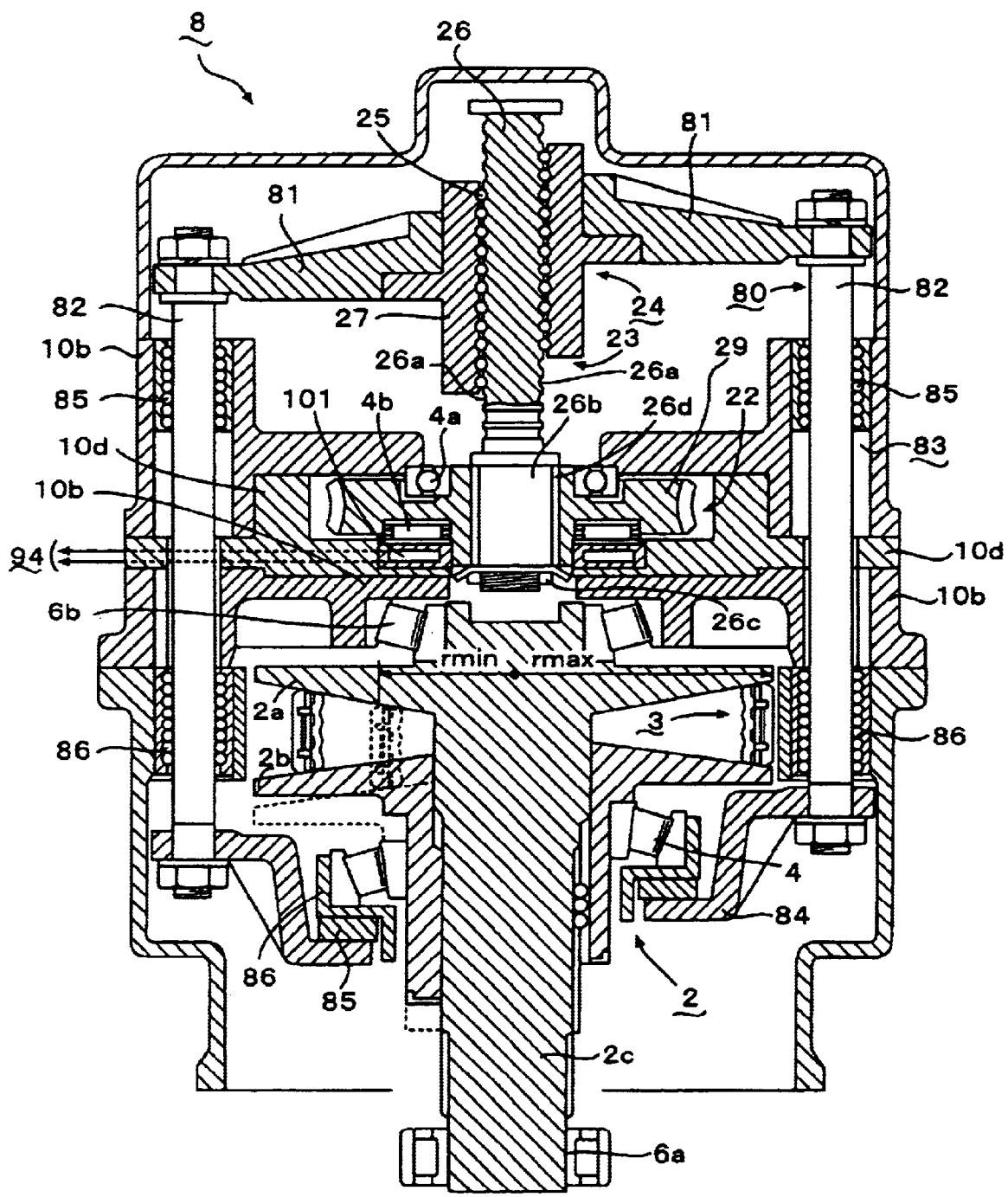
FIG. 11 is a sectional view of an output pulley and an output operating unit in the third embodiment.

FIGS. 10 and 11 shows a third embodiment showing a common base idea of the present invention, in which both the operating units are not always switched in function to constitute the first transmitting device A. In the present embodiment, in the whole speed change area, the input operating unit 9 performs the follower function of variable pressing control for always supplying the elastic force, and the output operating unit 8 performs the reference function of variable positioning control for supplying the pressing force at the time of speed change and being non-pressurizing at the fixed pitch. The method for applying the huge external pressure to the pulley in order to obtain the great friction force between the belt and the pulley is not stable in friction coefficient and results in disablement in transmission caused by the surplus friction force. Particularly, this tendency tends to occur in the output pulley 2 rather than the input pulley 1. The reason is that the output rotating speed becomes smaller, and conversely, the output torque TO is required to increase that portion. In the present embodiment, when a control instruction is supplied, even if the pressing force is supplied, the external pressure caused by the pressing device is not at all applied to the V-groove of the output pulley 2 at the time of the operation at the fixed pitch other than the former, but there is merely provided the constitution equal to the V-groove of the fixed pitch pulley. The secureness of the fixed output torque is an idea decided merely by the belt tension applied by the elastic friction force of the input pulley 1 which performs the follower function by the input operating unit 9. Even the tension type belt in which the rolling-in phenomenon tends to occur, as in the chain belt 3 in the figure, or even the compression type belt in which such a phenomenon is hard to occur performs the stable transmission and the high efficient transmission in the big large area irrespective of the type.

In terms of construction, the input operating unit 9 is a unit in which the contact device 35 is removed from the operating unit 9 shown in FIG. 9. The output operating unit 8 has the construction in which the composite device 40 is removed from the operating unit 8 shown in FIGS. 1, and 3 or 8, the pressing force is applied only at the time of variable speed motion by the pressing device 24 having he sliding device 23 and the urging device 22 connected directly and the output pulley 2 performs the reference function for variable pitch control. Other constructions are the same as the first and second embodiments, detailed description of which is omitted with the same reference numerals attached. The pressure detector 94 detects the pressure in the thrust bearing 4b of the wheel 29, and therefore, can always detect the value of the friction force between the compressing device 24 and the body 10d via the movable disk 1a and the pressure transmitting device 80, and the torque control by proper friction force control can be achieved by the controlling device 90 similarly to the other embodiments.

Other Embodiments

In the aforementioned embodiments, the reason why any one of the input and output pulleys has the follower function caused by the elastic force is that the ability of absorbing erroneous factors such as the peripheral length elongation of the belt, the thickness abrasion or the like is allowed to be possessed by the elastic force itself to perform the stable transmission. Accordingly, even the continuously variable transmission in which the input operating unit 9 and the output operating unit 8 are assembled in the construction shown in FIG. 10 and in the construction shown in FIG. 3, respectively, when the input elastic member 32 has the spring pressure selected to be greater than that of the output elastic member 42 to function as the pressing force substantially, even if the elastic force is supplied to the input and output pulleys simultaneously in order to perform the stable transmission, the timing for supplying the pressing force should not be given simultaneously to both of the pulleys. The same is true when the function of both the operating units 8 and 9 is switched and also for the presence of the reason for applying the fundamental pressure Pso to the output pulley 2. Further, even if the operating unit 9 shown in FIG. 10 and the known fixed pitch pulley not show are applied to the input pulley 1 and the output pulley, respectively, the idea of the present invention for controlling the output torque by the input operating unit can be achieved, and is included in the scope of the present invention.

Accordingly, various changes and modifications within the scope capable of easily created by those skilled in the art from claims are included in the present invention.

According to the present invention, in order to secure the fixed output torque, the input pulley is subjected to external variable pressing control, without depending on the direct external pressing to the output pulley, to obtain the output friction force indirectly via the belt, and therefore, the constitution for creating the output shaft torque may be of any construction, and the short of the friction force in the input pulley can be eliminated. Particularly, in the continuously variable transmission in which the variable pitch pulley is used for the input and output pulleys, when the contact radius or area between the belt and the pulley increases, the substantial pressing force is not applied to the pulley movable disk except the speed change motion, and the contact friction force is created indirectly by the wedge effect between the V-belt and the pulley V-groove on the basis of the belt tension generated by the mating pulley friction force, thus overcoming the instability of the friction coefficient which varies with the external pressing force, and achieving the stable and high efficient transmission even at the time of high load torque. Particularly, even the tension type belt which tends to produce the phenomenon in which the belt moves into the pulley, so-called rolling-in phenomenon will not result in disablement of transmission to create the stable wedge friction force despite the change in the peripheral conditions such as material of the belt and pulley, wet and dry lubricity, temperature or the like, thus realizing the stable transmission without separately taking the rolling-in preventive measures such as the unstable cam mechanism or the like in prior art. The increase and decrease of the belt contact radius occur in the input and output pulleys, and the operating units have the switching ability of the reference function or the follower function relative to the corresponding pulley to thereby considerably enlarge the stably transmittable speed change area and moreover maintain the high efficient transmission in both-end areas, thus providing the effect, in the field of vehicles, power plants or the like, of realizing the transmitter with low cost, low operating cost, and high efficiency.

What is claimed is:

1. A continuously variable transmission including:
    a plurality of variable pitch pulleys each having a movable disk and a fixed disk and connected with an input shaft and an output shaft;
    an endless V-belt extended between both said variable pitch pulleys;
    an operating unit distinguishingly applying a pressing force or elastic force to each of said movable disks of said variable pitch pulleys;
    a controlling device carrying out a stable transmission between said input and said output shafts;
    a first transmitting device variably controlling a rotation number and a torque arranged such that said operating unit individually controls and applies a pressing force to one pulley of said both variable pitch pulleys and an elastic force generated by compressing in series a first elastic member to another pulley;
    a second transmitting device variable controlling a rotation number and a torque arranged such that said operating unit individually controls and applies an elastic force generated by compressing in series a second elastic member to one pulley of said both variable pitch pulleys and a pressing force to another pulley; and
    switching means achieving high transmission efficiency and wide-band transmissible ratio area by way of alternatively switching from one of said first and second transmitting devices to the other at an optional point of said ratio area.

2. The continuously variable transmission according to claim 1, wherein in said first and second transmitting devices, said one pulley and said another pulley shared for said first and second transmitting devices are a single input pulley and a single output pulley, respectively, each to be distinguished the pulley function part responsive to pressure of said pressing force and said elastic force.

3. The continuously variable transmission according to claim 1, wherein said switching means switches at a boundary between a large ratio area and a small ratio area which are individually applied to said first transmitting device and said second transmitting device.

4. The continuously variable transmission according to claim 1, wherein in said first and second transmitting devices, said one pulley and said another pulley shared for said first and second transmitting devices are with a single output pulley and a single input pulley, respectively, each to be distinguished the pulley function part responsive to pressure of said pressing force and said elastic force.

5. The continuously variable transmission according to claim 4, wherein said switching means makes said first transmitting device operate in a large ratio area and said second transmitting device operate in a small ratio area upon using of said endless V-belt.

6. The continuously variable transmission according to claim 1, wherein said switching means has transducer means to exchange electric instructions for switching applied by said controlling device into mechanical instructions.

7. The continuously variable transmission according to claim 6, wherein said switching means includes a driving source urged by said electric instructions, a pressing device and a contact device as said transducer means.

8. A continuously variable transmission including:
    an input pulley and an output pulley each having a movable disk and a fixed disk mounted on an input shaft and an output shaft, respectively;
    an endless V-belt extended between said input pulley and said output pulley;
    a first operating unit applying a pressing force to one pulley of said input and said output pulleys;
    a second operating unit applying an elastic force to the other pulley of said input and said output pulleys;
    first and second elastic devices individually compressed in series in said first and second operating units, respectively, to supply individually an elastic force to said input and output pulleys;
    said first operating unit capable of applying a control elastic force of a predetermined value or a controllable and arbitrary value passing through said first elastic device simultaneously and in parallel with said movable disk of said one pulley upon supply of said pressing force; and
    a controlling device carrying out a high efficient transmission between said input and output pulleys to a portion or a whole of a variable speed ratio area in accordance with supplying of said control elastic force and said elastic force applied individually thereto via said first and second operating units.

9. The continuously variable transmission according to claim 8, wherein said device is arranged such that said input pulley controls a rotation number when the output pulley controls a torque.

10. The continuously variable transmission according to claim 8, wherein said device arranged such that said output pulley controls a rotation number when the input pulley controls a torque.

11. A continuously variable transmission including:

input and output pulleys each having a movable disk and a fixed disk mounted on input shaft and output shafts, respectively, and an endless V-belt extended between said input and output pulleys;

input and output pressing devices supplying a pressing force to one of said input and output pulleys, and an elastic force to another thereof;

input and output elastic devices having an input and an output elastic member for supplying an elastic force to said input and output pulleys;

a driving source for driving said input and output pressing devices synchronously or asynchronously;

a controlling device applying individual pressing instructions to said input and output pulleys via said driving source; and switching means for switching and supplying an elastic force to said another pulley upon supply of a pressing force to said one of said pulleys, or switching and supplying the pressing force to said another pulley upon supply of the elastic force to said one of said pulleys.

12. The continuously variable transmission according to claim 11, wherein said switching means is provided with input and output contact devices capable of controlling the presence or absence of supply of said pressing force to said movable disks of said pulleys in accordance with a contact or release state according to a presence or absence of a clearance between two sliders.

13. The continuously variable transmission according to claim 12, wherein said pressing devices are arranged such that said contact device is in parallel with said elastic device, and is in series to a compressing device included in each said pressing devices.

14. The continuously variable transmission according to claim 13, wherein said respective pressing devices are a composite pressing device or an individual pressing device formed by a compressing device commonly composed of said contact device and said elastic device, or individually composed to each said pressing devices.

15. A continuously variable transmission including:

an input pulley and an output pulley applied to an input shaft and an output shaft, respectively, and each comprising a movable disk and a fixed disk;

an endless V-belt applied between said pulleys disposed in a direction reversed to each other on said respective shafts;

input and output operating units in which input and output compressing devices provided on input and output pressing devices correspond and for displacing said movable disk of each of said pulleys by a driving source;

input and output elastic devices in which said input and output pressing devices have input and output elastic members for supplying an elastic force to each other said pulleys;

said input and output pressing devices which have first input and output pressing devices for applying a pressing force not through said elastic member by each said compressing device, and second input and output pressing devices for applying an elastic force via said elastic member by each said compressing device, said input and output pressing devices distinguishing and supplying the elastic force or the pressing force to said movable disk of each pulley;

a first transmitting device for applying a follower function to said input pulley in said second input pressing device and a reference function to said output pulley in said first output pressing device, respectively, by the operation of said operating units;

a second transmitting device for applying the reference function to said input pulley in said first input pressing device and the follower function to said output pulley in said second output pressing device, respectively, by the operation of said operating units;

switching means for alternatively switching said first transmitting device and said second transmitting device; and a controlling device synchronously switching both said operating units to operate said first transmitting device in the predetermined area of a variable speed area, and said second transmitting device in another area except said predetermined area thereof, respectively.

16. The continuously variable transmission according to claim 15, wherein said compression devices are composed of a winding-up screw pressing mechanism or oil pressure pressing mechanism, and provide a self-locking function upon non-supply of pressing instructions.

17. The continuously variable transmission according to claim 15, wherein said compressing device comprises a sliding device applied with a pressing means between two sliding elements and an urging device for moving said pressing means, and one or both of said sliding device a urging device have a self-inversion impeding or self-locking function.

18. The continuously variable transmission according to claim 15, wherein one of said input operating unit has a pressure transmitting device comprising upper and lower lateral transmitting means extending laterally from a pressure receiving point as a central point;

a longitudinal transmitting means comprising two pressing shafts connecting between ends of said lateral transmitting means, and a supporting device for slidably supporting said longitudinal transmitting means by a body and a bearing.

19. The continuously variable transmission according to claim 15, wherein said controlling device has a pulley rotation number detector for each said pulley, and switches said first and second transmitting devices at an optional speed ratio according to a speed ratio or an output rotation number.

20. The continuously variable transmission according to claim 15, wherein said controlling device switches at a speed ratio of approximately $\epsilon=1$ in reference with a position of said belt between said first and second transmitting devices.

21. The continuously variable transmission according to claim 15, wherein said controlling device releases a compressed state of said elastic devices in a high compressing state during stoppage of the transmission.

22. The continuously variable transmission according to claim 15, wherein said output operating unit has a pressure transmitting device comprising upper and lower lateral transmitting means extending laterally from a pressure receiving point as a central point;

a longitudinal transmitting means comprising two pressing shafts connecting between ends of said lateral transmitting means, and a supporting device for slidably supporting said longitudinal transmitting means by a body and a bearing.

23. The continuously variable transmission according to claim 22, wherein in one of said input and output operating units, pressure is transmitted by said pressure transmitting device among said elastic device, said contact device, said compressing device, or said pressing device disposed at a place away from one pulley of said input and output pulleys and said compressing device, said elastic or contact device, or a pulley bearing disposed around said one pulley.

24. A continuously variable transmission including:

an input pulley and an output pulley applied to in input shaft and an output shaft, respectively, and comprising a movable disk and a fixed disk;

an endless V-belt applied between said pulleys disposed in a direction reversed to each other on said respective shafts;

input and output operating units in which input and output pressing devices move said corresponding movable disk of each of said pulleys by a driving source;

an individual pressing device which has a first pressing device for a first compressing device to press in series a contact device and apply a reference function caused by the pressing force corresponding to said pulley, and has a second pressing device for a second compressing device to press in series an elastic device and apply a follower function provided by the elastic force corresponding to said pulley, said individual pressing device switching and supplying the respective functions to the corresponding pulleys in accordance with a control instruction;

a composite pressing device in which the contact device and the elastic device are pressed in series by a single compressing device and are further connected in parallel with each other, and said contact device causes a compressive displacement of said elastic device to be impossible at the time of contact motion and possible at the time of release of the contact, to distinguish and supply the pressing force or the elastic force to the corresponding pulley in accordance with the control instruction;

said input and output operating units in which one of said input and output pressing devices is composed of said individual pressing device and the other is composed of said composite pressing device; and a controlling device for controlling the switching in order that one pulley of said input and output pulleys has a follower pulley function when the other pulleys has a reference function.

25. The continuously variable transmission according to claim 24, wherein said controlling device has a pressure detector for detecting an output friction force disposed between a body, and said output contact and elastic devices.

26. A continuously variable transmission including:

an input pulley and an output pulley applied to an input shaft and an output shaft, respectively, and each comprising a movable disk and a fixed disk;

an endless V-belt applied between said pulleys disposed in a direction reversed to each other on the respective shafts;

input and output operating units in which input and output pressing devices move said corresponding movable disk of each of said pulleys by a driving source;

an individual pressing device applying pressure to said movable disk of said input or output pulleys, including:

a first pressing device for always applying an elastic force generated by pressing in series an elastic device by a first compressing device to impart a follower function caused by a variable pressing control to the corresponding pulley movable disk; and a second pressing device for applying a pressing force generated by pressing in series a contact device by a second compressing device at the time of a speed change to impart a reference function caused by a variable pitch positioning control for said V-belt to the corresponding pulley movable disk;

said input or output operating units having an individual pressing device comprising said first and second pressing devices in order to supply one or both of the pressing force and the elastic force to said input or output pulley; and a controlling device applying control and switching instructions of the reference function or the follower function to each said operating unit in order that the other provides the follower function when one of said corresponding pulleys provides the reference function.

27. The continuously variable transmission according to claim 26, wherein said first and second pressing devices place one of said compressing devices annularly to extend through one shaft of said input and output shafts and places the other on an extension of said shaft.

28. The continuously variable transmission according to claim 26, wherein said controlling device switches a pulley function at an arbitrary contact position of said V-belt of a whole speed ratio area or output rotation number, or affecting transmission without switching in the whole speed ratio.

29. The continuously variable transmission according to claim 26, wherein in both said operating units, one of said operating units comprises an elastic pressing device for compressing in series an elastic device by a compressing device, and the other comprises said individual pressing device.

30. The continuously variable transmission according to claim 26, wherein said controlling device individually is applying compensating instructions of rotation number or torque for said pulleys to said pressing devices.

31. A continuously variable transmission including:

an input pulley and an output pulley applied to an input shaft and an output shaft, respectively, and comprising a movable disk and a fixed disk;

an endless V-belt applied between said pulleys disposed in a direction reversed to each other on the respective shafts;

input and output operating units to which input and output pressing devices press and displace the corresponding movable disk of each of said pulleys by a driving source;

a composite pressing device having an elastic pressing device for pressing in series a compressing device and an elastic device to supply an elastic force, and a non-elastic pressing device for pressing in series said compressing device and a contact device to supply a pressing force;

wherein a compressive displacement of said elastic device connected in parallel with said contact devices is impossible at a time of contact motion and possible at a time of release of the contact motion to distinguish and supply at least the pressing force and the elastic force;

said input or output operating units at least driving said composite pressing device for distinguishing the pressing force or the elastic force according to a control instruction relative to said input or output pulley to switch and supply a reference function or a follower function, so as to give one of said input and output pulleys the reference function and the other the follower function; and a controlling device supplying variable control instructions to said respective operating units.

32. The continuously variable transmission according to claim 31, wherein said composite pressing device has said contact device on a coaxial circle internally or externally of said elastic device formed annularly.

33. The continuously variable transmission according to claim 31, wherein said composite pressing device is a single composite device having said contact device for controlling a clearance between two sliding materials, and said elastic device comprising two sliders and an elastic member, and formed into an annular framework with one end closed by one of said two sliders.

34. The continuously variable transmission according to claim 33, wherein said composite pressing device has one of said sliding materials used in common to said slider formed into said framework, and the other disposed slidably sandwiching said elastic member between said two sliding materials, and is a closed type assembly sealed compression of said elastic member by said two sliding materials at minimum compression pressure Ps1 at the time of contact of both said sliding materials and is disposed on said input operating unit.

35. The continuously variable transmission according to claim 33, wherein said composite pressing device has one of said sliding materials used in common to said slider formed into said framework, and the other disposed slidably sandwiching said elastic member between two sliding materials, and an assembly always supplying maximum compression pressure Ps0 of said elastic member at the time of contact of both said sliding materials and is disposed on said output operating unit.

36. A continuously variable transmission for transmitting between an input shaft and an output shaft, comprising;

a first variable transmission device arranged such that a first operating unit individually controlling and giving one of two variable pitch pulleys a pressing force and the other an elastic force, variably press-controls a first transmitting device including said two variable pitch pulleys each having at least a movable disk, and an endless belt, so as to perform higher efficiency in a first speed ratio range than a second variable transmission device;

said second variable transmission device arranged such that a second operating unit individually controlling and giving one of two variable pitch pulleys a pressing force and the other an elastic force, variably press-controls a second transmitting device including said two variable pitch pulleys each having at least a movable disk, and an endless belt, so as to perform higher efficiency in a second speed ratio range than said first variable transmission device;

a switching device alternatively selecting said first and said second variable transmission devices to widen an entire transmittable range while keeping high efficiency by combining with said first speed ratio range and said second speed ratio range between said input and output shafts; and a controlling device giving said first and second operating units control instructions and giving said switching device a switching instruction.

37. The continuously variable transmission according to claim 36, wherein in said first and said second variable transmission devices, said first and said second transmitting devices are shared by a single transmitting device having input and output pulleys and an endless belt.

38. The continuously variable transmission according to claim 36, wherein in said first and second variable transmission devices, said first and second speed ratio ranges are a large and a small speed ratio range.

* * * * *